May 24, 1960

J. J. FITZGERALD ET AL 2,938,121

PERSONNEL NEUTRON DOSIMETER

Filed Nov. 19, 1956

INVENTOR.
JOSEPH J. FITZGERALD &
CHARLES G. DETWILER, JR.
BY
Roland G. Anderson
Attorney May 24, 1960 J. J. FITZGERALD ET AL 2,938,121
PERSONNEL NEUTRON DOSIMETER
Filed Nov. 19, 1956 3 Sheets-Sheet 2

INVENTOR.
JOSEPH J. FITZGERALD &
CHARLES G. DETWILER, JR.
BY

May 24, 1960   J. J. FITZGERALD ET AL   2,938,121
PERSONNEL NEUTRON DOSIMETER
Filed Nov. 19, 1956

INVENTOR.
JOSEPH J. FITZGERALD &
CHARLES G. DETWILER, JR.
BY
Attorney

2,938,121
Patented May 24, 1960

2,938,121

PERSONNEL NEUTRON DOSIMETER

Joseph J. Fitzgerald, Latham, and Charles G. Detwiler, Jr., Scotia, N.Y., assignors to the United States of America as represented by the United States Atomic Energy Commission Filed Nov. 19, 1956, Ser. No. 623,267

4 Claims. (Cl. 250—83.1)

This invention relates to a personnel neutron dosimeter and more particularly to a resonance-threshold personnel neutron dosimeter that incorporates metal foils whose activation by neutron flux is determinative of neutron dosage received by the person wearing the dosimeter.

Nuclear fission reactors and critical assemblies produce neutron flux which is harmful biologically to personnel exposed thereto. Therefore, it is important that personnel working in the vicinity of such neutron sources be limited in their total neutron dose. The neutron flux escaping from a reactor is composed of a wide spectrum of energies called the physical neutron spectrum which, for convenience in the following discussion, is classified into thermal, slow, intermediate and fast regions. The evaluation of the biological effect of the neutrons upon personnel is equally as important as determination of the physical neutron spectrum thereof. Inasmuch as the biological effect varies with the energy and quantity of the neutrons, its evaluation necessitates not only the determination of the physical neutron spectrum but also knowledge of the relative biological effect of specific neutron energies. So far as any person in the vicinity of a reactor is concerned, the particular neutron flux to which he is exposed will depend upon his particular location since the quantity and type of shielding between him and the escaping neutron flux is involved.

While it is important that there be permanent neutron flux monitoring systems installed in a reactor area, it is imperative that each person be able to carry a dosimeter that will provide routine information concerning his neutron exposure. For large organizations, it is important that the personnel neutron dosimeter be simply constructed, be relatively inexpensive and be capable of being kept in operating condition by relatively unskilled personnel.

Before our invention, neutron dosimeters were usually sensitive only to thermal, to slow, to intermediate or to fast neutrons rather than the physical neutron spectrum. Single unit standard dosimeters cannot readily give a measurement of the total neutron dose when exposed to a spectrum of neutrons in the presence of gamma radiation. Although tissue-equivalent neutron dosimeters are effective in the determination of the total neutron dose, in the presence of gamma radiation, the gamma dose must be determined by use of another chamber in order to make a proper neutron dose determination. X-ray and nuclear emulsion films are frequently used for neutron monitoring but they are time-consuming dosimeters and often yield limited information concerning total neutron dose. For example, in an emergency condition it is often impossible by using nuclear track emulsions to determine the total neutron dose if it exceeds 20 rem (roentgen equivalent mammal). In addition, prior dosimeters yield no information on the quantity of neutrons that are moderated by the human body or absorbed by the body before they are effectively detected by the dosimeter.

With our invention the physical spectrum can be evaluated thus permitting an energy-corrected total neutron dose determination. Thermal and slow neutron dose measurements as low as 25 mrem. (milliroentgen equivalent mammal) can be made on a routine basis. The total neutron dose can be measured following unusually high exposure to fast neutrons exceeding 2.5 rem. and doses in the lethal dose range can be readily determined with our invention. Further, with our invention it is possible to interpret, in substantially all cases, the total neutron dose regardless of the relative positions of the source, the body and the personnel neutron dosimeter. This cannot be accomplished by use of the standard neutron film badge.

Thus, our invention permits evaluation of the neutron hazard to which a person wearing the dosimeter has been exposed. One method we have found to be suitable for the determination of the hazard involves (1) the determination of the physical neutron spectrum to which the person has been exposed; and (2) determination of the total biological dosage received which is obtained from the numerical integration of the product of the physical neutron spectrum and the unit biological neutron spectrum, the latter being an index of the maximum permissible neutron flux to which a person should be exposed for specific neutron energies, (the values of the product are referred to collectively as the biological neutron spectrum).

Hence, it is a requirement for a personnel neutron dosimeter that the physical neutron spectrum to which an individual is exposed be determined in order that the total neutron biological dose can be evaluated. It is also a requirement that the total neutron dose be determinable regardless of the relative positions of the source, the body and the dosimeter. It is an additional requirement that the dosimeter be capable of monitoring the physical neutron spectrum on a routine basis. Further it is a requirement that the determination of the dosage received not be time-consuming but be economical and have considerable sensitivity and range of application. And still further, it is a requirement that the dosimeter monitor neutrons in the presence of gamma radiation.

A principal object of our invention is the provision of a simply constructed personnel neutron dosimeter which will meet all of the above stated requirements.

Another object of our invention is the provision of a personnel neutron dosimeter which may be analyzed and kept in operating condition by relatively unskilled personnel thereby adapting the instrument for use in large organizations without unreasonable expense.

Another object of our invention is the provision of a personnel neutron dosimeter through whose use the neutron hazard to which personnel have been exposed can be determined.

Still another object of our invention is the provision of a personnel dosimeter through whose use the total neutron dose to an exposed person can be determined regardless of the relative positions of the source, the body and the dosimeter.

A further object of our invention is the provision of a personnel neutron dosimeter which can be used on a routine basis for the monitoring of neutrons of all energies.

An additional object of our invention is the provision of a personnel neutron dosimeter whose analysis is little time-consuming and is economical.

Still a further object of our invention is the provision of a personnel neutron dosimeter capable of monitoring neutrons in the presence of gamma radiation.

Other and further objects will become apparent during the course of the following description.

Generally, our invention is a radiation dosimeter which when exposed to a range of energies, the range having a plurality of regions, of a particular form of radiation provides a measure of the physical spectrum of the particular radiation and dose thereof. The dosimeter includes at least first, second, third and fourth means responsive to the particular radiation. The first means includes a detector of radiation of energy in a first and second region of the range. The second means has a second detector and a material which prevents radiation in the first region from reacting with the second detector so that the second detector is sensitized by radiation in the second region. The third means has a third detector sensitized by radiation in the second region and means for absorbing radiation in the first region and therebetween an energy-moderating material which slows down radiation in a third region of the range to radiation in the second region. The fourth means has a material sensitized by radiation in a fourth region of the range.

One convenient means of translating neutron energy into available information utilizes activation of metal foils by the neutrons. The activation method for measuring a physical neutron spectrum is convenient when a compact and sensitive detector is required. The foil activation technique results from the fact that some elements, for example, indium, have one resonance in their absorption cross-section much larger than any other. That is to say, neutrons are captured predominantly within a small energy interval. These are termed resonance isotopes. On the other hand, some elements, for example, aluminum, have a large absorption cross-section for neutron energies only above a certain threshold value. These are termed threshold isotopes.

When an indium foil is exposed to neutrons of a range of energies, thermal and slow neutrons are absorbed while intermediate and fast neutrons are transmitted. Since cadmium is an effective absorber of thermal neutrons, when a similar indium foil is covered by cadmium and exposed in substantially the same position to the same neutron flux, the activation therein will be due predominantly to slow neutrons and the major portion of these are indium-resonance neutrons with an average energy close to 1.4 e.v. The product is mainly a beta emitter with a half-life of 54 minutes. The ratio of the activity of the uncovered indium foil to the activity of the cadmium-covered indium foil is defined as the cadmium ratio.

The efficiency of a particular counter arrangement for measuring activation of an irradiated foil depends on the geometry of both the counting tube and the foil. In order to assign a quantitative measure to the counting efficiency, the counting geometry is defined as the ratio of the events counted by the counter to the number of disintegrations which actually occurred in the foil during a given time interval. The counting geometry as defined here depends not only on the arrangement of the counting tube and foil but also on absorption and scattering of the beta particles by the foil and surroundings. It is desirable in the practice of our invention in order to insure as accurate a determination as possible of the physical neutron spectrum that the time of exposure be known as well as the time delay after exposure before the activation measurements are made on the foils. We have found that a conventional Geiger-Müller survey meter and a conventional mica end-window Geiger-Müller tube can advantageously be used in conjunction with our invention for determining foil activation, as will be explained later.

An embodiment of our invention comprises a personnel neutron dosimeter which when exposed to a range of neutron energies provides a measure of the physical neutron spectrum and neutron dose. Its case is made of two conforming relatively thick foils of aluminum which are activated by fast neutrons of energy above the aluminum threshold. A sandwich of three thin conforming foils of indium is sustained in an opening in the case and exposed directly to the neutron flux to be monitored and is effective in the absorption of the thermal, indium-resonance and slow neutrons transmitted to it. The indium foil closest to the body will absorb a large percentage of the thermal, indium-resonance and slow neutrons which are moderated by the body and returned to the detector. The inner foil will absorb a fraction of the higher energy neutrons to approximately the same degree as each of the other two of the three indium foils. Sustained in another opening of the case and exposed to neutrons is a stack consisting of a sandwich of three thin conforming foils of indium between discs of cadmium. The cadmium discs effectively absorb thermal neutrons incident on or reflected from the body and transmit only those neutrons above the cadmium cut-off (0.5 e.v. for 10 mil cadmium). Activation in the indium foils is due to indium-resonance and slow neutrons in the same manner as in the non cadmium shielded foils. The outer indium foils are termed exterior resonance foils and the inner foil the interior resonance foil. The difference in the activity induced in the interior foil and an exterior foil is a measure of the indium resonance flux incident on the exterior foil.

Sustained in still another opening of the case and exposed to neutrons is a pile consisting of a sandwich of three thin conforming foils of indium between discs of polyethylene to which are affixed cadmium discs between the polyethylene discs and the neutron source. The cadmium absorbs thermal neutrons and the polyethylene moderates intermediate neutrons so that the transmitted neutrons have energies in the indium-resonance and slow regions, and, as such, activate the sandwich.

The drawings, which are illustrative only, are as follows.

The details of the invention and the various novel features and constructional arrangements embodied therein will be made more apparent by reference to the following description and the drawings of one illustrative embodiment thereof.

Figure 1:
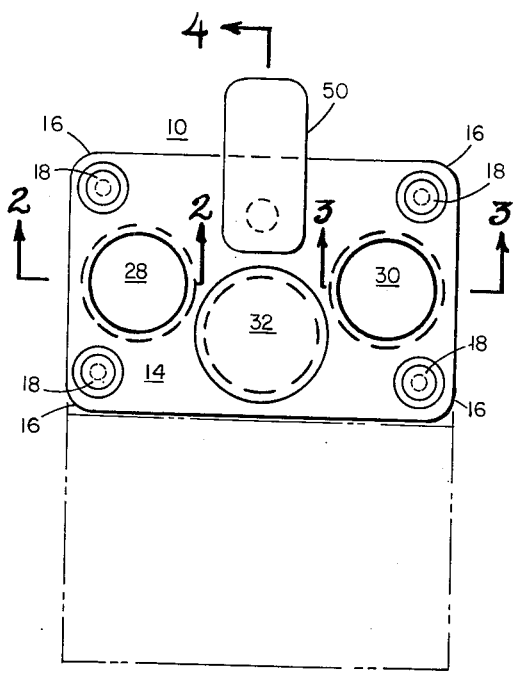
Figure 1 is a rear elevation of the assembled dosimeter showing the openings for the foils and the manner of securing front and back pieces of aluminum together.

Figure 1 shows a rear view of the personnel neutron dosimeter as it is worn. Its case 10 is comprised of two rectangularly shaped matched pieces of aluminum, namely, front piece 12 and back piece 14, of which only the back piece is visible in Figure 1. These pieces have rounded corners 16 and are held together by eyelets 18 disposed through holes near the corners of said sheets. The heads of eyelets 18 are countersunk below the surfaces of front piece 12 and back piece 14.

Figure 4:
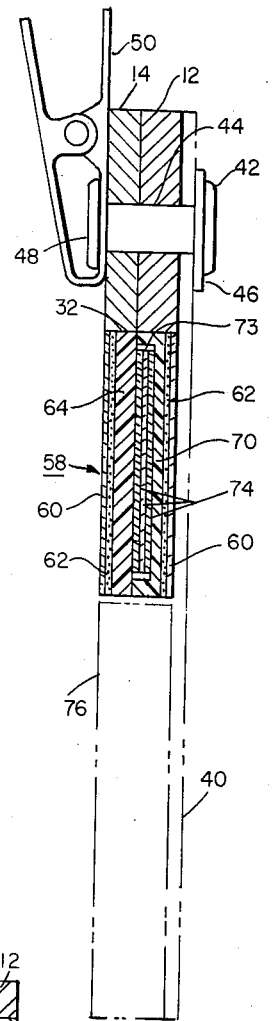
Figure 4 is an enlarged side elevation, partly in section, taken on line 4—4 of Figure 1 showing the characteristics of the intermediate neutron detector in position in the opening at that section, a security identification badge, a film beta-gamma dosimeter and the manner in which the neutron dosimeter is secured to the identification badge.

Figure 4 shows clearly the manner by which the neutron dosimeter is secured to a security identification badge 40, not otherwise described herein, by the head 42 of an eyelet 44 bearing on washer 46 together with the other head 48 of the eyelet. The head 48 also holds a clip 50 against the back of the badge loosely enough to permit rotation of the clip which is used to attach the badge to the wearer's clothing.

Figure 2:
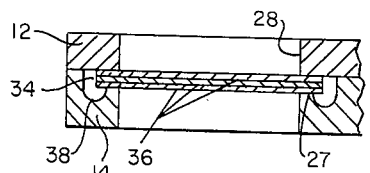
Figure 2 is an enlarged fragmentary section of Figure 1 taken on the line 2—2 showing the structure of the indium sandwich and the manner in which it is held in position between the front and back pieces.

A first circular opening 28 is located in the left central portion of said case (as viewed from the back, and a second circular opening 30 of comparable size is located in the right central portion of said case. A third, somewhat larger, circular opening 32 is located in the lower central portion of said case, directly below the clip 50. As shown, particularly in Figure 2, the mating face of back piece 14 is counterbored at 27 around the opening 28 to a width and depth sufficient to accommodate snugly between front piece 12 and back piece 14 a sandwich 34 of three thin circular conforming indium foils 36. Around the periphery of said counterbore 27 there is an annular groove 38 of semi-circular cross section whereby the edge of said sandwich is held between an annular rim or lip and the face of front piece 12. The groove 38 serves to assist in the machining of counterbore 27.

Figure 3:
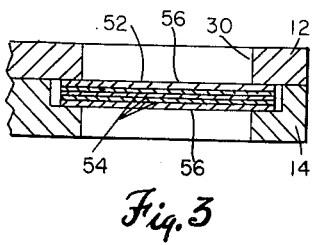
Figure 3 is an enlarged fragmentary section of Figure 1 taken on the line 3—3 showing the characteristics of the cadmium-indium stack and the manner in which it is held in position between the front and back piece.

Back piece 14 (Figure 3) is also counterbored in its mating face at opening 30 to form an annular recess of width and depth sufficient to accommodate snugly between front piece 12 and back piece 14 a stack 52 of three circular thin conforming indium foils 54 between thin cadmium discs 56.

As illustrated in Figure 4, disposed in opening 32 is pile 58. Pile 58 consists of two thin outermost discs of cadmium 60 secured by cement layers 62 to relatively thick polyethylene discs 64 and 70. A sandwich 73 of three circular thin conforming foils of indium 74 is emplaced snugly between the polyethylene discs 64 and 70 in a counterbore in one of them, disc 70. In one embodiment we have used aluminum pieces 12 and 14 of 0.102 inch thickness, indium foils 36, 54 and 74 of 0.003 inch thickness and cadmium discs 56 and 60 of 0.010 inch thickness. Also mounted on security identification badge 40, as by eyelets, not shown, is a conventional personnel beta-gamma dosimeter 76.

Figure 5:
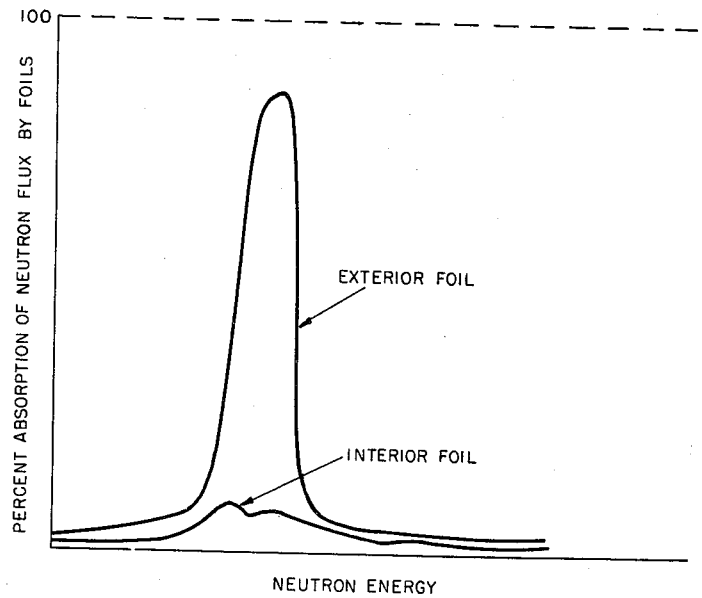
Figure 5 illustrates two curves of the relation of the absorption of the neutron flux to the neutron energy for both the interior and the exterior indium foils in a cadmium-indium stack.

We have found that in the practice of our invention, it is possible to determine the indium-resonance neutron flux incident on our personnel neutron dosimeter by taking the product of a foil calibration constant, C, and the saturated resonance activity, the difference between activity induced in the interior foil and the average activity induced in the exterior indium foils of stack 52. There is illustrated in Figure 5 a typical relationship between the absorption of the neutron flux and the neutron energy for both an exterior foil and the interior foil of stack 52. The calibration constant can be determined experimentally by measuring the induced activity in a foil at varying distances from a known neutron source. It can also be determined by calculation from the counting geometry in counts/neutron, the surface area of the foil in square centimeters, the foil thickness in centimeters, the absorption cross-section in square centimeters and the resonance energy of the foil in electron volts. Typical values of C for a few isotopes as determined both by experiment and by calculation are given in Table 1 below.

TABLE 1

*Typical foil calibration constants*

| Foil | Thickness, in. | Weight, g. | Single Foil | |
|---|---|---|---|---|
| | | | C (Experimental) | C (Calculated) |
| In | 0.010 | 0.75 | 63.7 | 63.0 |
| Au | 0.002 | 1.10 | 29.0 | 29.2 |
| Mn | 0.010 | 1.83 | 127.0 | 130.0 |

If one foil calibration constant has been determined either experimentally or by calculation, other foil calibration constants of foils of the same element but with different dimensions can be readily determined by the following expression:

$$C_1 K_1 A_1 X_1 = C_2 K_2 A_2 K_2 \qquad (1)$$

where, $K$ = counting geometry in counts/neutron
$A$ = saturated resonance activity in counts/sec.
$X$ = thickness of the foil in cm.

We have provided by our invention a personnel neutron dosimeter which when exposed to a range of neutron energies provides a measure of the thermal, slow, intermediate and fast regions of the physical neutron spectrum and the neutron dose thereof. In the practice of our invention, the thermal neutron dose is obtained by direct measurement of the activation of the indium foils in sandwich 34 and in stack 52.

Figure 7:
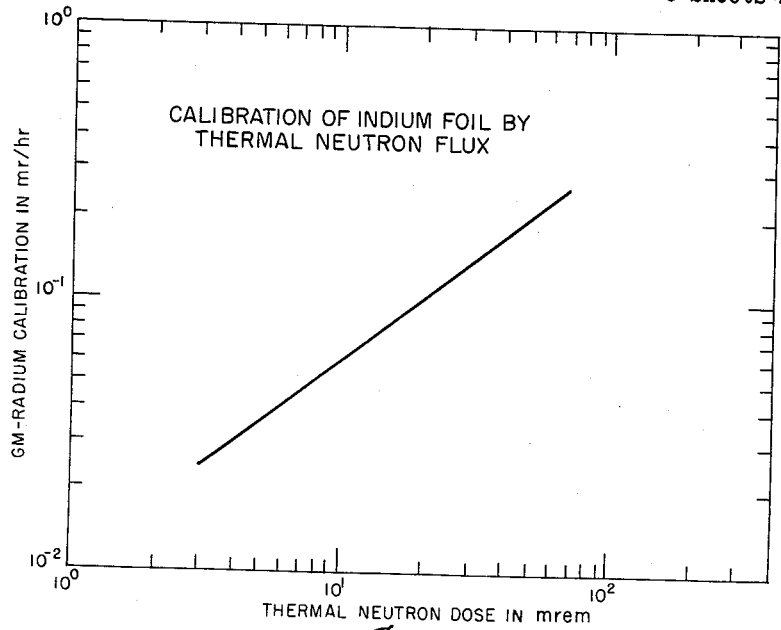
Figure 7 is a typical calibration of the activation of an indium foil by a thermal neutron flux as observed with a Geiger-Müller survey meter, the curve showing the relationship between the radium calibration in mr./hr. of the survey meter and thermal neutron dose in mrem.

To obtain this measure of the thermal neutron dose we take the average of the activity of the exterior resonance foils of stack 52 and subtract the activity of the interior resonance foil thereof. Then we multiply the resultant value by the indium foil calibration constant described above to obtain a first product. Similarly, for the resonance foils of sandwich 34, we obtain a second product. The difference between the second product and first product is the activity in sandwich 34 due to thermal neutrons. Comparison of the thermal neutron activity thus obtained with a calibration curve such as shown in Figure 7 gives the thermal neutron dose. Of course, when the cadmium ratio, as defined above, is known for the particular components of the dosimeter it can be multiplied by the first product to obtain the thermal neutron induced activity in sandwich 34. The typical calibration curve of Figure 7 gives the activation of an indium foil by a known thermal neutron flux which we have obtained with a conventional Geiger-Müller survey meter. The calibration curve gives the relationship between a radium calibration of the meter in mr./hr. and the thermal neutron dose in mrem.

The thermal neutron flux incident on the dosimeter can also be obtained by extrapolating the indium-resonance spectrum to 0.1 e.v. and using the cadmium ratio as defined above together with the value of the most probable neutron calculated from a Maxwellian distribution of the thermal neutron energies.

According to NBS Handbook No. 55, based on a value of 300 mrem./40 hour working week, 1 MPF is equivalent to 2000 thermal neutrons/cm.$^2$/sec. or 7.5 mrem./hr. Statistical analysis of several similar calibration curves indicates that a dose of 10±6.7 mrem. can be detected with 95% confidence level and a maximum permissible daily dose can be reported at the 95% confidence level as 50±17.5 mrem.

The intermediate neutron flux incident on the dosimeter may be determined by direct measurement of the activity of indium foils 74 of sandwich 73. While the activation is due to slow neutrons, including indium-resonance neutrons, they have been moderated by polyethylene discs 64 and 70 from intermediate neutrons to provide the slow neutrons which induce the activity in foils 74. Thermal neutrons have been eliminated by the cadmium cover. Thus a measure of the intermediate flux is obtained by taking the product of the indium foil calibration constant and the difference between the average activity of the outer foils of sandwich 73 and the activity of the inner foil.

Figure 8:
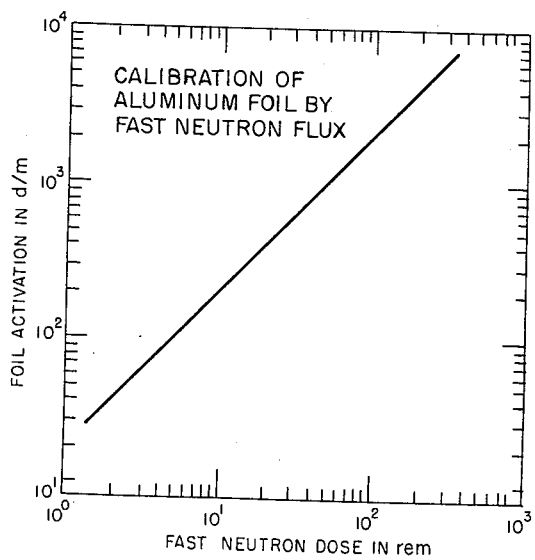
Figure 8 is a typical calibration of aluminum foil activated by a fast neutron flux with observations made by a mica end-window Geiger-Müller tube, the curve showing the relationship between foil activation in disentegrations per minute and the fast neutron dose in rem.

We have found that in the practice of our invention, and particularly in an emergency condition, it is possible to obtain a satisfactory determination of the fast neutron flux and dose by measurement of the activation of the foils of the aluminum case of our dosimeter. Figure 8 shows the calibration of aluminum foil by fast neutron flux which we have obtained by use of a mica end-window Geiger-Müller tube. The calibration curve gives the foil activation in disintegrations per minute, d./m., and the fast neutron dose is in rem. It is based on the NBS Handbook No. 55 value for a 40 hour working week of 30 fast neutrons/cm.$^2$/sec. equivalent to 7.5 mrem./hr. Thus, we determine the fast neutron dose by measuring the activation of aluminum case 10 with a conventional mica end-window Geiger-Müller tube in conjunction with the calibration curve of Figure 8. For emergency monitoring, statistical analysis of several similar curves has shown that a fast neutron exposure of 5±2.5 rem. can be measured.

While the calibration curves of Figures 7 and 8 are typical, individual calibrations are required for dosimeters differing in structure.

Figure 6:
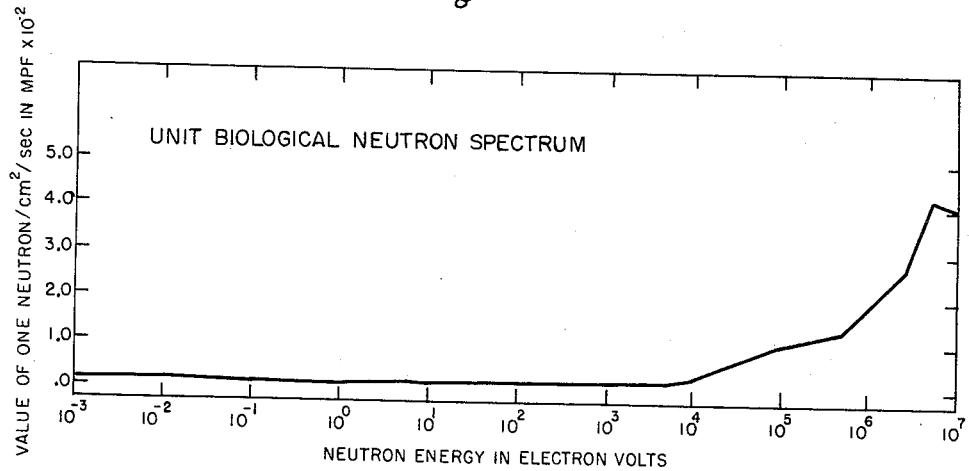
Figure 6 is the unit biological neutron spectrum, a curve showing the relationship between the value of one neutron per square centimeter per second in $MPF \times 10^{-2}$ and neutron energy in electron volts.

When it becomes desirable to know the total biological dosage received, it is possible to estimate it through use of the biological neutron spectrum. The maximum permissible flux, MPF, has been calculated for several neutron energies and is available in the literature. The literature values have been converted to the value of a single neutron of a specific energy in terms of the MPF as shown in Figure 6. The relationship of the MPF to the neutron energies for the specific physical neutron spectrum ascertained through practice of our invention is obtained by taking the product of the physical spectrum and the unit biological values; this product is termed the biological neutron spectrum. The average maximum permissible flux for any energy interval is conveniently obtained by numerical integration of the biological neutron spectrum for that interval.

In the practice of our invention, we have found the information given in Tables 2 and 3 below to be useful:

TABLE 2

Physical dimensions of foils

| Isotope | Resonance Energy, e.v. | Foil Thickness, inch | Foil Area, cm.$^2$ | Foil Weight, g. |
|---|---|---|---|---|
| In—115 | 1.44 | 0.005 | 10.1 | 0.95 |
| Au—197 | 4.8 | 0.002 | 16.4 | 1.10 |
| Mn—55 | 300.0 | 0.010 | 9.5 | 1.83 |
| Al—27 | 2300.0 | 0.006 | 17.1 | 0.70 |

TABLE 3

Radiological properties of foils

| Isotope | Beta Radiation, Mev. | Half Life |
|---|---|---|
| In—116 | 0.9, 4.0 | 54 m. |
| In—116 | 2.8 | 13 s. |
| Au—197 | 0.9 | 2.69 d. |
| Mn—55 | 2.9, 1.0 | 2.59 hr. |
| Al—27 | 3.0 | 2.3 m. |

For purposes of illustration, a specific embodiment of the invention has been disclosed but it is recognized that many modifications may appear to a person skilled in the art without departing from the intended scope of the invention. The dosimeter of our invention is above all a simple and highly effective device. It is substantially foolproof and the evaluation of the data is by standard techniques which may be carried out rapidly and reliably by relatively unskilled labor.

While the salient features of the present invention have been described in detail with respect to this one embodiment, it will, of course, be apparent that numerous modifications may be made within the scope and spirit of the invention and it is therefore not desired to limit the invention to the exact details shown except insofar as they may be defined in the following claims.

We claim:

1. A personnel neutron dosimeter which on exposure to neutrons is capable of determining the physical neutron spectrum and whether the exposure of the dosimeter was received before or after the neutrons passed through the body of the wearer, said dosimeter comprising a case having a neutron activation threshold for fast neutrons; first, second and third neutron responsive means supported in said case, said first means comprising a stack of three superimposed foils of a material activated by thermal, resonance and slow neutrons; said second means comprising a stack of three superimposed foils identical with said first stack and sandwiched between two layers of a thermal neutron absorbing material whereby said second stack is activated by resonance and slow neutrons; a third stack of three superimposed foils of a material identical with that in said first and second stacks, said third stack being sandwiched between two layers of a solid thermal neutron moderating material to form a composite, said composite being in turn sandwiched between two layers of a thermal neutron absorbing material, whereby the material in said third stack is activated by neutrons of intermediate energy that have been moderated to slow and resonance energy levels by said moderating material, and means for securing the case to clothing of the wearer whereby one side of a layer of each of the three stacks faces the wearer and one side of a second layer of each of the three stacks faces away from the person of the wearer.

2. A dosimeter as set forth in claim 1 wherein the foils are of indium.

3. A dosimeter as defined in claim 2 wherein the thermal neutron absorbing material is cadmium and the solid thermal neutron moderating material is polyethylene.

4. A dosimeter as defined in claim 3 wherein the case is aluminum.

References Cited in the file of this patent

UNITED STATES PATENTS

| 2,556,768 | McKibben | June 12, 1951 |
| 2,659,013 | Davis et al. | Nov. 10, 1953 |
| 2,747,103 | Fairbanks et al. | May 22, 1956 |

OTHER REFERENCES

Photographic Neutron Dosimetry II, by Dessauer et al., AECD-1973, May 1948.

Tittle: Nucleonics, vol. 8, No. 6, June 1951, pages 5 to 9.

Hurst et al.: Review of Scientific Instruments, vol. 27, No. 3, March 1956, pages 153 to 156.